US012697585B2

(12) United States Patent
Dehlsen

(10) Patent No.: US 12,697,585 B2
(45) Date of Patent: Aug. 4, 2026

(54) WIND-POWERED DIRECT AIR CARBON DIOXIDE CAPTURE FOR OCEAN SEQUESTRATION

(71) Applicant: Dehlsen Associates of the Pacific, Limited, Santa Barbara, CA (US)

(72) Inventor: James George Purnell Dehlsen, Warkworth (NZ)

(73) Assignee: Dehlsen Associates of the Pacific Limited, Santa Barbara, CA (US)

( * ) Notice: Subject to any disclaimer, the term of this patent is extended or adjusted under 35 U.S.C. 154(b) by 0 days.

(21) Appl. No.: 17/391,884

(22) Filed: Aug. 2, 2021

(65) Prior Publication Data

US 2021/0362094 A1     Nov. 25, 2021

Related U.S. Application Data

(60) Continuation of application No. 17/163,295, filed on Jan. 29, 2021, now Pat. No. 11,660,572, which is a
(Continued)

(30) Foreign Application Priority Data

Sep. 22, 2017     (NZ) ........................................ 735748

(51) Int. Cl.
*C02F 1/44*          (2023.01)
*B01D 61/02*          (2006.01)
(Continued)

(52) U.S. Cl.
CPC ......... *B01D 61/081* (2022.08); *B01D 61/025*
(2013.01); *B01D 61/026* (2022.08);
(Continued)

(58) Field of Classification Search
CPC .... B01D 61/08; B01D 61/022; B01D 61/025;
B01D 61/10; B01D 63/06; B01D
2313/06;
(Continued)

(56) References Cited

U.S. PATENT DOCUMENTS 4,125,463  A     11/1978  Chenoweth
4,222,874  A      9/1980  Connelly
(Continued)

FOREIGN PATENT DOCUMENTS

AU          2007231797      * 11/2007
AU          2019226096  A1    10/2020
(Continued)

OTHER PUBLICATIONS

Thiel et al, ACS Sustainable Chem. Eng. 2017, 5, 11147-11162. (Year: 2017).*
(Continued)

*Primary Examiner* — Pranav N Patel
(74) *Attorney, Agent, or Firm* — Akerman LLP; Trevor Coddington

(57)          ABSTRACT

Power generated by a wind turbine is applied to drive reverse osmosis (RO) desalination. Rather than discharging the brine back into the ocean, it is concentrated and modified through industrial-scale processes to produce sodium hydroxide (NaOH). Direct air capture of $CO_2$ occurs when liquid NaOH, created from the RO desalination brine, is conveyed to the rotor hub and emitted from the wind turbine blades to react with $CO_2$ in the atmosphere. The power of an offshore wind turbine is used for the onboard production of fresh water to supply shoreside water needs, or water may be electrolyzed to produce hydrogen while adding the vital process of $CO_2$ sequestration to the ocean.

17 Claims, 3 Drawing Sheets

Related U.S. Application Data continuation-in-part of application No. 17/087,309, filed on Nov. 2, 2020, now Pat. No. 12,102,964, which is a division of application No. 16/129,783, filed on Sep. 12, 2018, now abandoned.

(51) Int. Cl.

| | |
|---|---|
| *B01D 61/08* | (2006.01) |
| *B01D 61/10* | (2006.01) |
| *B01D 63/06* | (2006.01) |
| *B63B 1/04* | (2006.01) |
| *B63B 35/44* | (2006.01) |
| *B63B 43/06* | (2006.01) |
| *B63B 77/00* | (2020.01) |
| *B63B 1/10* | (2006.01) |
| *B63B 39/03* | (2006.01) |
| *B63B 43/04* | (2006.01) |
| *C02F 103/08* | (2006.01) |

(52) U.S. Cl.
CPC ............ *B01D 61/10* (2013.01); *B01D 63/06* (2013.01); *B63B 1/048* (2013.01); *B63B 43/06* (2013.01); *B63B 77/00* (2020.01); *C02F 1/441* (2013.01); *B01D 2313/06* (2013.01); *B01D 2313/206* (2022.08); *B01D 2313/367* (2022.08); *B01D 2313/54* (2013.01); *B01D 2313/57* (2022.08); *B01D 2315/06* (2013.01); *B01D 2317/04* (2013.01); *B01D 2317/06* (2013.01); *B63B 2001/044* (2013.01); *B63B 1/107* (2013.01); *B63B 2035/442* (2013.01); *B63B 39/03* (2013.01); *B63B 2043/047* (2013.01); *C02F 2103/08* (2013.01); *C02F 2201/007* (2013.01); *C02F 2201/008* (2013.01); *C02F 2303/10* (2013.01); *C02F 2307/00* (2013.01)

(58) Field of Classification Search
CPC ............ B01D 2313/20; B01D 2313/54; B01D 2313/56; B01D 2315/06; B01D 2317/04; B01D 2317/06; B01D 2313/36; B63B 1/048; B63B 43/06; B63B 77/00; B63B 1/107; B63B 39/03; B63B 2001/044; B63B 2035/442; B63B 2043/047; B63B 43/14; B63B 2001/145; B63B 2035/446; C02F 1/441; C02F 2103/08; C02F 2201/007; C02F 2201/008; C02F 2303/10; C02F 2307/00; C02F 2201/009; Y02A 20/141; Y02A 20/212; Y02A 20/131; Y02W 10/30; Y02W 10/33
See application file for complete search history.

(56) References Cited

U.S. PATENT DOCUMENTS

| | | | |
|---|---|---|---|
| 4,350,895 | A | 9/1982 | Cook |
| 4,919,060 | A | 4/1990 | Cady |
| 7,731,375 | B2 | 6/2010 | Palmer et al. |
| 7,754,169 | B2 | 7/2010 | Constantz et al. |
| 7,821,148 | B2 | 10/2010 | Piasecki et al. |
| 7,939,951 | B2 | 5/2011 | Usui |
| 8,291,714 | B2 | 10/2012 | Omielan et al. |
| 8,328,515 | B2 | 12/2012 | Dawoud et al. |
| 8,405,236 | B2 | 3/2013 | David |
| 8,702,847 | B2 | 4/2014 | Lackner et al. |
| 8,932,024 | B2 | 1/2015 | Hayashi et al. |
| 8,933,575 | B2 | 1/2015 | Lipman |
| 9,260,314 | B2 | 2/2016 | Constantz et al. |
| 9,334,849 | B2 | 5/2016 | Dehlsen |
| 9,834,455 | B2 | 12/2017 | Frolov et al. |
| 10,982,654 | B1 | 4/2021 | Dehlsen |
| 11,660,572 | B2 | 5/2023 | Dehlsen |
| 11,701,616 | B2 | 7/2023 | Dehlsen |
| 12,102,964 | B2 | 10/2024 | Dehlsen et al. |
| 2002/0071235 | A1 | 6/2002 | Gorczyca et al. |
| 2003/0189000 | A1 | 10/2003 | Stark et al. |
| 2006/0119106 | A9 | 6/2006 | Borden et al. |
| 2008/0031801 | A1* | 2/2008 | Lackner ............... C01F 11/18 |
| | | | 62/602 |
| 2009/0115190 | A1* | 5/2009 | Devine ................. C25B 9/70 |
| | | | 204/554 |
| 2009/0212560 | A1 | 8/2009 | Larsen |
| 2010/0126164 | A1 | 5/2010 | Gerber et al. |
| 2011/0103950 | A1 | 5/2011 | Pesetsky et al. |
| 2011/0171107 | A1 | 7/2011 | Britten |
| 2011/0215039 | A1 | 9/2011 | Acernese et al. |
| 2012/0001431 | A1 | 1/2012 | Smith |
| 2015/0251924 | A1 | 9/2015 | Li et al. |
| 2015/0260152 | A1 | 9/2015 | Dehlsen |
| 2015/0290589 | A1 | 10/2015 | Hoffman |
| 2016/0101994 | A1 | 4/2016 | Vuong |
| 2016/0296881 | A1* | 10/2016 | Douglas ............... A01G 15/00 |
| 2016/0369646 | A1 | 12/2016 | Hendrix |
| 2017/0233977 | A1 | 8/2017 | Cole et al. |
| 2017/0349455 | A1 | 12/2017 | Katz |
| 2019/0078556 | A1 | 3/2019 | Stiesdal |
| 2019/0162167 | A1 | 5/2019 | Gonzalez Perez |
| 2020/0010155 | A1 | 1/2020 | Robinson et al. |
| 2021/0387133 | A1 | 12/2021 | Lackner et al. |
| 2022/0274063 | A1 | 9/2022 | Dehlsen |

FOREIGN PATENT DOCUMENTS

| | | | |
|---|---|---|---|
| BR | PI1001623-6 | A2 | 7/2011 |
| CA | 2367715 | C | 4/2008 |
| CN | N2863263 | Y | 1/2007 |
| CN | 101415937 | B | 5/2011 |
| CN | 102726336 | * | 10/2012 |
| CN | 203058157 | U | 7/2013 |
| CN | 206366465 | U | 8/2017 |
| CN | 214629373 | U | 11/2021 |
| EP | 1637214 | A1 | 3/2006 |
| EP | 2067964 | B1 | 2/2013 |
| GB | 2546251 | A | 7/2017 |
| JP | 2008063960 | A | 3/2008 |
| JP | 6639212 | B2 | 2/2020 |
| NL | 1023999 | C1 | 1/2005 |
| RU | 2436708 | C1 | 12/2011 |
| RU | 2642203 | C2 | 1/2018 |
| WO | 2008115662 | A2 | 9/2008 |
| WO | WO2008115662 | * | 9/2008 |
| WO | 2011011740 | A1 | 1/2011 |
| WO | 2016057717 | A1 | 4/2016 |
| WO | 2019165151 | A1 | 8/2019 |

OTHER PUBLICATIONS

Stolaroff et al, Environ. Sci. Technol. 2008, 42, 2728-2735. (Year: 2008).*

Ma et al., Proceedings of the ASME 2014 International Design Engineering Technical Conferences and Computers and Information in Engineering Conference. Symposium, vol. 5A: 38th Mechanisms and Robotics Conference. Buffalo, NY, USA, Aug. 17-20, 2014. (Year: 2014).

Miriello et al., Proceedings of the ASME 2019 38th International Conference on Ocean, Offshore and Arctic Engineering OMAE2019. Symposium, Jun. 9-14, 2019, Glasgow, Scotland, UK. (Year: 2019).

Thiel et al., "Utilization of Desalination Brine for Sodium Hydroxide Production: Technologies, Engineering Principles, Recovery Limits, and Future Directions," ACS Sustainable Chemistry and Engineering, 2017, vol. 5, pp. 11147-11162 (2017).

* cited by examiner

WIND-POWERED DIRECT AIR CARBON DIOXIDE CAPTURE FOR OCEAN SEQUESTRATION

CROSS-REFERENCE TO RELATED APPLICATIONS

The present application is a continuation-in-part of U.S. patent application Ser. No. 17/163,295, entitled "Wind and Wave Desalination Vessel," and filed on Jan. 29, 2021, which is a continuation-in-part of U.S. patent application Ser. No. 17/087,309, entitled "Reverse Osmosis Water Production Apparatus," and filed on Nov. 2, 2020, which claims priority to U.S. patent application Ser. No. 16/129,783, entitled "Reverse Osmosis Water Production Apparatus," and filed on Sep. 12, 2018, the entire disclosures of which are all incorporated by reference herein.

BACKGROUND OF THE INVENTION

1. Field of Invention

This invention relates to the sequestration of atmospheric carbon dioxide.

2. Description of Related Art

To mitigate global heating, deep reductions in carbon dioxide ($CO_2$) emissions are required to reduce atmospheric $CO_2$ concentration. Carbon dioxide is a greenhouse gas that absorbs and radiates heat from the sun. $CO_2$ concentrations are rising primarily because fossil fuels are burned for power production, the $CO_2$ trapping additional heat and raising Earth's average temperature. The scale needed to transform the world's primary energy sources from carbon-emitting fossil fuels to renewable energy is vast. It requires an alarming transition rate, indicating that carbon dioxide capture and storage are imperative to achieving the level of future $CO_2$ reduction needed to combat global warming and climate change.

Current techniques for carbon capture are directed at capturing $CO_2$ from large stationary sources, such as power plants. Typically, $CO_2$ is separated from flue gas, compressed, and transported to be sequestered underground.

Direct ambient air capture (DAC) of $CO_2$ occurs when ambient air passes across an alkaline solution, such as sodium hydroxide. However, various DAC methods have proved costly due to the energy needed to process sufficient amounts of air to capture dilute (~419 ppm) atmospheric $CO_2$, the cost and delivery of the alkaline feedstock, the transfer and containment of the $CO_2$ to be sequestered, and the large land area and structures needed for the air processing system.

Water loss may be substantial in an air capture system as the relatively low concentration of $CO_2$ in the atmosphere requires a large amount of interaction between the gaseous and the liquid phases. Fresh water availability is a significant problem in many parts of the world. As rising atmospheric temperatures drive changes in the hydrological cycle, water availability for DAC is often limited. In a typical DAC system, water loss is about 20 moles for every mole of $CO_2$ absorbed (at 15 degrees C. and 65% RH). However, it can be lowered significantly by appropriate design and operating parameters.

It is compelling to look beyond land-based $CO_2$ sequestration to the oceans, for both process water availability and the sequestration of $CO_2$, mimicking parts of the natural cycle of ocean $CO_2$ absorption and helping to reduce the acidification of the oceans. Rising atmospheric $CO_2$ has led to more $CO_2$ dissolving into the sea and a drop in average pH (now about 8.1).

SUMMARY OF THE INVENTION

The present invention overcomes these and other deficiencies of the prior art by utilizing an offshore wind turbine for an efficient DAC process. Power generated by a wind turbine is applied to drive reverse osmosis (RO) desalination. Rather than discharging the resulting brine back into the ocean, it is concentrated and modified through industrial-scale processes to produce sodium hydroxide (NaOH). Direct air capture of $CO_2$ occurs when liquid NaOH, extracted from the RO desalination brine, is conveyed to the rotor hub and emitted from the wind turbine blades to react with $CO_2$ in the atmosphere. The power of an offshore wind turbine is used for the onboard production of fresh water to supply shoreside water needs while adding the vital process of $CO_2$ sequestration to the ocean.

In addition to delivering fresh water to shore, brine processed by electrolysis produces NaOH, chlorine gas ($Cl_2$), and hydrogen gas ($H_2$). The hydrogen can be captured as fuel for power generation by a fuel cell or by thermal combustion, as needed during times of diminished power from the wind turbine due to low-windspeeds or turbine outage for servicing.

Hydrogen is also an essential part of the transition away from fossil fuels, particularly for transportation. Offshore wind turbines producing hydrogen can serve the fueling needs of new fuel cell electric marine vessels, trending toward powering by non-fossil fuels. Hydrogen production by electrolysis is energy-intensive, consuming about 55 MWh/tonne of hydrogen. Wind turbine power used for RO desalination must be balanced against the power used for the brine purification, concentration, and electrolysis to yield hydrogen, chlorine, and the sodium hydroxide used for carbon dioxide sequestration.

The present invention provides significant benefits compared to offshore turbines delivering only electric power and desalinated water to shore. It reduces, if not eliminates, brine discharge into the ocean and provides an additional yield of desalinated water. Sodium hydroxide produced from brine and subsequent $CO_2$ sequestration is achieved with low capital cost and wind energy. In addition to hydrogen, the present invention produces chlorine, and hydrochloric acid, valued commodities, which can be used in seawater reverse osmosis and NaOH production processes. The hydrogen can serve as energy storage for power generation during periods of low production by the wind turbine or sold as higher value "green hydrogen."

In an embodiment of the invention, a direct air carbon dioxide capture device comprises a wind turbine generator comprising one or more blades; a desalination system, wherein the desalination produces brine; means for producing an alkaline solution from the brine; and means for emitting the alkaline solution into an air stream passing through the one or more blades. The means for emitting the alkaline solution comprises a plurality of nozzles disposed on the one or more blades. The desalination system comprises a reverse osmosis system or an evaporator and condenser. The reverse osmosis system is powered by energy generated by the wind turbine generator. The means for producing the alkaline solution comprises a brine purification system and a brine concentration system. The brine purification system and the brine concentration system are powered by energy generated by the wind turbine generator. The device further comprises an electrolysis system, storage for hydrogen gas, and storage for chlorine gas, wherein the electrolysis system is powered by energy generated by the wind turbine generator. The device further comprises a direct electrosynthesis system, wherein the direct electrosynthesis system produces the alkaline solution and hydrochloric acid, the alkaline solution comprising sodium hydroxide. The means for producing the alkaline solution comprises a heater using heat from the wind turbine generator. The device further comprises a pump for conveying the alkaline solution to the means for emitting the alkaline solution into an air stream passing through the one or more blades, wherein the pump uses centrifugal force induced by the one or more blades.

In another embodiment of the invention, a method of capturing atmospheric carbon dioxide for ocean sequestration comprises the steps of generating electric power via a wind turbine generator located in a saltwater environment; desalinating salt water from the saltwater environment, using the electric power generated via the wind turbine generator, to produce brine; processing the brine, using the electric power generated via the wind turbine generator, to produce sodium hydroxide; and emitting the sodium hydroxide solution into an air stream passing through a rotor of the wind turbine generator. The step of desalinating salt water produces fresh water. The step of processing the brine comprises the steps of purifying the brine to produce purified brine; increasing salt concentration of the purified brine to produce concentrated brine; and performing electrolysis on the concentrated brine to produce the sodium hydroxide solution, hydrogen gas, and chlorine gas. The method further comprises the steps of compressing and storing the hydrogen gas and converting the chlorine gas into a chlorine-based chemical. The step of processing the brine comprises the steps of direct electrosynthesis of the sodium hydroxide solution and hydrochloric acid through electrodialysis. The step of emitting the sodium hydroxide solution comprises spraying the sodium hydroxide solution via a plurality of nozzles disposed on one or more blades of the wind turbine generator. The step of desalinating salt water comprises reverse osmosis or evaporation and condensation. The step of processing the brine comprises electrosynthesizing the brine to form the sodium hydroxide solution and hydrochloric acid. The method further comprises the step of reacting the emitted sodium hydroxide solution with atmospheric carbon dioxide to form sodium carbonate or sodium bicarbonate. The method further comprises the steps of mixing the sodium carbonate or sodium bicarbonate into the saltwater environment and sequestering the sodium carbonate or sodium bicarbonate into the saltwater environment.

The foregoing and other features and advantages of the invention will be apparent from the following, more particular description of the invention's preferred embodiments, as shown in the accompanying drawings and the claims.

BRIEF DESCRIPTION OF THE DRAWINGS

For a complete understanding of the present invention and its advantages, reference is now made to the ensuing descriptions taken in connection with the accompanying drawings briefly described as follows.

DETAILED DESCRIPTION OF PREFERRED EMBODIMENTS

Figure 1:
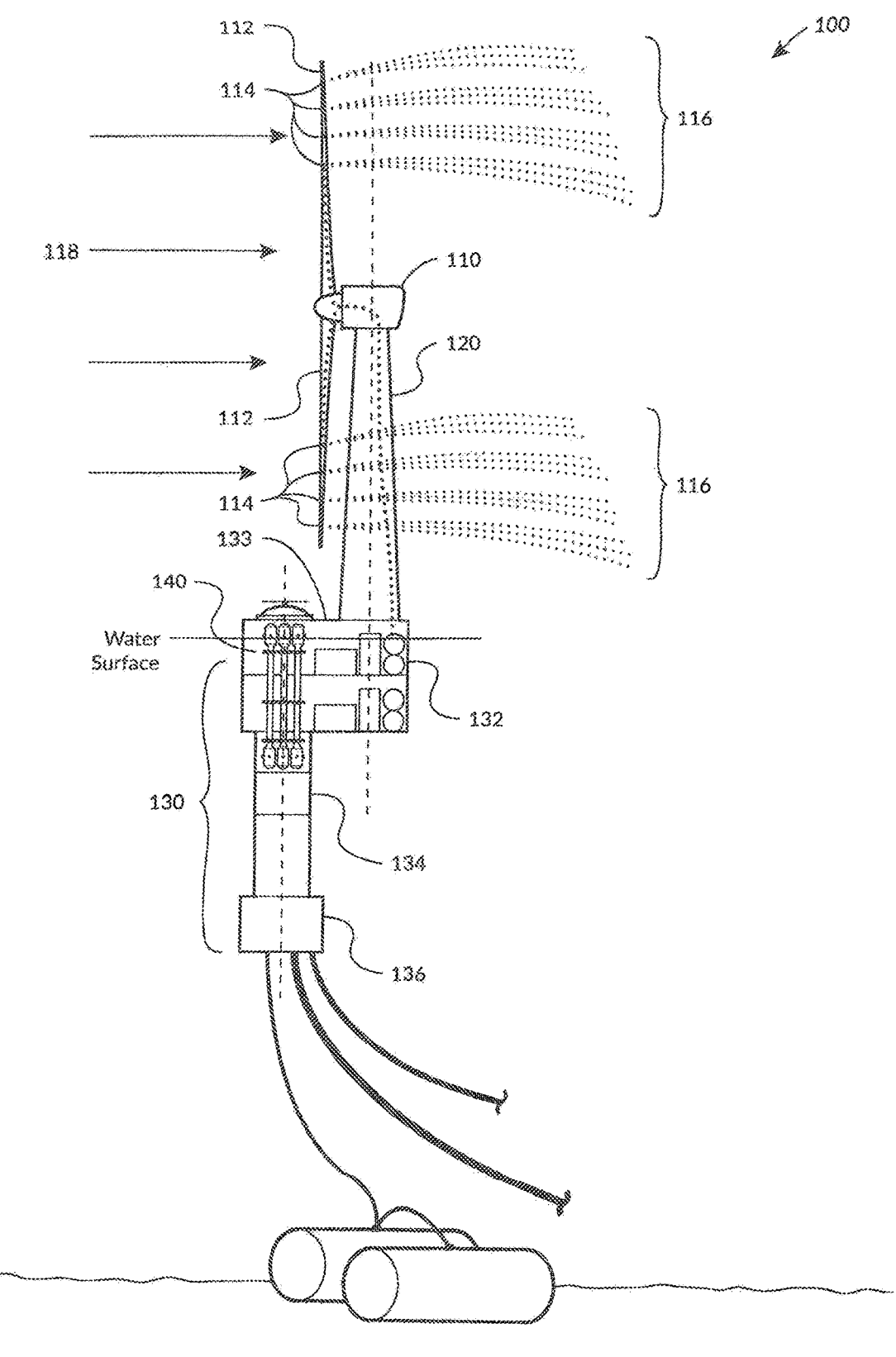
FIG. 1 illustrates a side view of a direct air carbon dioxide capture device according to an embodiment of the invention.
Figure 2:
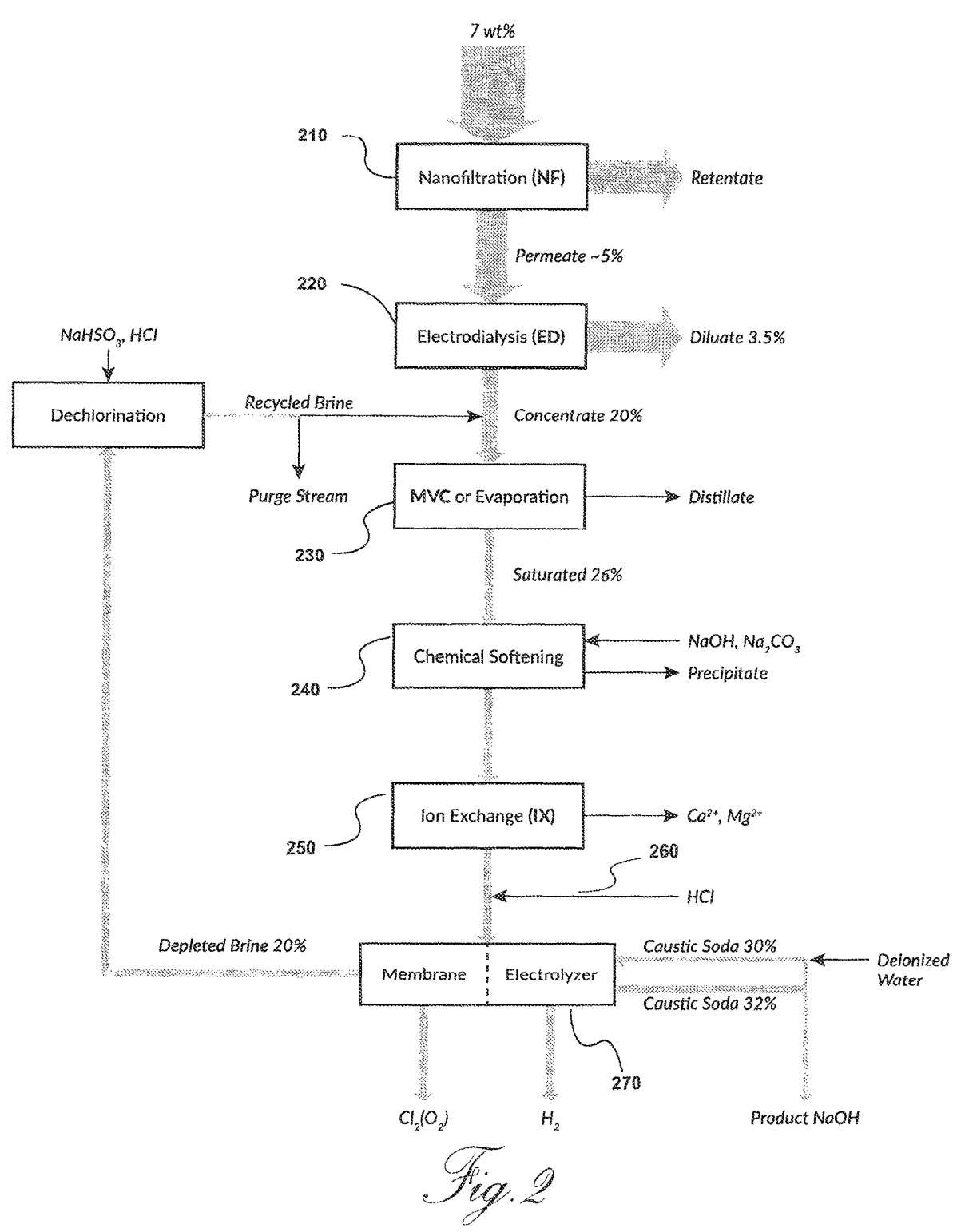
FIG. 2 illustrates a chlor-alkali NaOH production process implemented on the direct air carbon dioxide capture system shown in FIG. 1, according to an embodiment of the invention.
Figure 3:
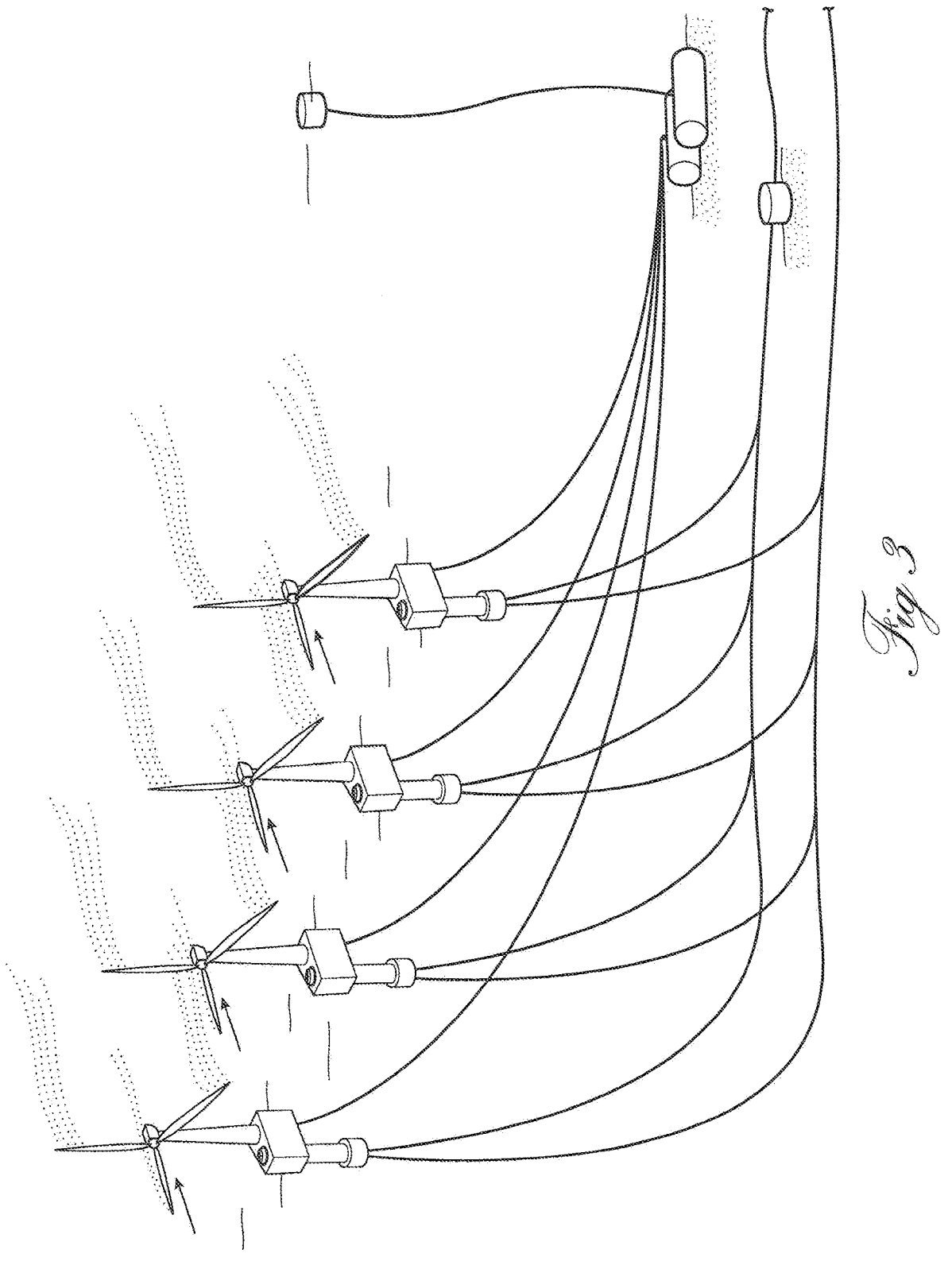
FIG. 3 illustrates a system of direct air carbon dioxide capture devices according to an embodiment of the invention.

Preferred embodiments of the present invention and their advantages may be understood by referring to FIGS. 1-3, wherein like reference numerals refer to like elements. The present invention may be deployed in any water environment, preferably where renewable wind energy is available. It can also be configured to use a range of alkaline $CO_2$ absorbents apart from NaOH.

The present invention employs an offshore wind turbine system that powers onboard reverse osmosis, producing desalinated water and brine, as disclosed in U.S. patent application Ser. No. 17/163,295, entitled "Wind and Wave Desalination Vessel," the entire disclosure of which is incorporated by reference herein. There, the brine is dispersed directly back into the ocean. This system is primarily for water supply to land but can also supply marine vessels.

The present invention advances the utility of an offshore wind turbine powering an onboard desalination plant. Rather than returning the brine to the ocean, it uses a portion of the power generated for on-site brine purification, concentration, and electrolysis. These are essential steps in producing sodium hydroxide for direct ambient air $CO_2$ absorption for ocean sequestration. Economical and clean wind energy directly powers the mechanical, thermal, and electrochemical process of using the brine recovered from seawater reverse osmosis (SWRO) desalination to produce streams of NaOH, chlorine ($Cl_2$), and hydrogen ($H_2$) through the chlor-alkali process while also increasing the delivery of desalinated water to shore by ~16%. An alternative process involving the direct electrosynthesis of NaOH and hydrochloric acid (HCl) from SWRO brine (through electrodialysis) can also be used depending on the required outputs.

The direct ambient air capture (DAC) system of the present invention is added to a wind turbine platform designed for reverse osmosis (RO) desalination. There are added costs for the equipment used to process the otherwise discharged brine, and a fraction of the power generated by the turbine is needed to produce NaOH, $H_2$, $Cl_2$, and HCl.

FIG. 1 illustrates a side view of a direct air carbon dioxide capture device 100 according to an embodiment of the invention. System 100 comprises a wind turbine generator (WTG) 110 with rotor blades 112, a tower (mast) 120, a spar buoy 130 including a main buoyancy section 132, a cylindrical section 134, and a ballast section 136. Above the ocean surface, deck 133 of the buoyancy chamber 132 joins the mast 120 on which mounts the tower base of the WTG 110. Housed within the buoyancy chamber 132 and the cylindrical section 134 or a portion thereof is a reverse osmosis system 140.

A NaOH solution is piped (as shown by dotted line) to the wind turbine's blades 112, which serve as a "rotor contactor," emitting the solution through nozzles 114 as a fine mist 116, into the wind 118 streaming through the rotor disc. Atmospheric $CO_2$ is absorbed by the NaOH mist, forming sodium carbonate and sodium hydrogen carbonate ("sodium bicarbonate"). The carbonate droplets are drawn by gravity to the surface layer of the ocean, where mixing by the orbital action of waves leads to increased levels of dissolved carbonates and gradual capture by marine organisms and incorporation into the natural carbon cycle.

The reaction solution drops landing on the ocean are mildly alkaline, comprising a mixture of carbonate, bicarbonate, and unreacted hydroxide ions. The present invention, therefore, has the potential to locally reduce ocean acidity with the associated benefits to marine ecosystems.

The component of the present invention that enables the NaOH to absorb atmospheric $CO_2$ is termed the "contactor." The turbine rotor contactor disperses the NaOH produced onboard through nozzles 114 on the turbine blades 112 to react with the dilute, ~419 ppm atmospheric $CO_2$. Since $CO_2$ is so dilute in air, the contactor must have a large cross-sectional area and sufficient airflow to process the large volumes of air required for $CO_2$ absorption. Wind turbine rotors provide an ideal means of exposure to large volumes of air. For example, a 10 MW wind turbine with a 220 m rotor has a swept area of 38,000 $m^2$ (about 9.4 acres). In an 8 m/s wind regime, the volume of air passing through the rotor in one hour is about 1 billion $m^3$, with an air stream run of 29 km and an air mass transport of air of 1.37 million tons. A rotor of this size operates at about 8 to 10 rpm with blade tip speeds typically exceeding 150 mph (240 kmph). The NaOH misting from the blade nozzles 114 interacts with the surrounding air stream 118, dispersing through the air mass flowing across the rotor, forming a spiraling wake from the turbine blades and mixing the NaOH droplets and $CO_2$ by the vortices and wind shear.

The selected blades determine optimization for the number of nozzles, fluid pressure, flow rate, and spray density. Control of droplet size is critical for efficient $CO_2$ absorption, with the ideal droplet diameter being 50 to 100 microns. The nozzles operate within this droplet size range, on pressures ranging from 100 to 620 kPa, producing various flow rates and spray patterns.

Nozzle selection is based upon the desired NaOH concentration, which is expected to be in the range of 0.35 and 5 molar (M) solution. The lower end of the range represents a dilute state, with viscosity and vapor pressure about the same as water. A 5M solution, with about a 20 wt. % sodium hydroxide represents the high end of the range with a solution viscosity about three times that of water.

In an embodiment of the invention, blade nozzle emitters are placed at points on the airfoil that minimally impact the aerodynamic efficiency of the blade. Diligent design of the nozzle array and spray patterns will optimize NaOH concentration in the air stream, spray patterns, and drop size—minimizing unfavorable drop coalescence.

Efficient absorption of ambient atmospheric $CO_2$ requires large volumes of air flowing through the rotor contactor. The design of the blade-contactor ensures a spray pattern where the NaOH has sufficient air retention time for absorption before drop coalescence, which sharply reduces $CO_2$ absorption capacity. The preferred embodiment uses a turbine tower height of greater than 80 meters to provide sufficient droplet air retention time and promote maximum $CO_2$ absorption before reaching the ocean surface.

The present invention includes integrating wind turbine power production with desalination and NaOH production, balancing the processes to optimize sodium hydroxide delivery to combine with diffuse atmospheric carbon dioxide. In an embodiment of the invention, a system controller uses machine learning to optimize the complete process of wind turbine variable power for NaOH production and maximize the efficiency of each step of the process chain with automated control of flow paths, flow rates, and solution concentrations, and chemical ratios.

Desalination by reverse osmosis (RO) increases seawater salinity of 3.5 wt. % to 7 wt. % and requires 3.0-4.5 kilowatt-hours per cubic meter of permeate (product water). The energy consumed in NaOH production ranges from 3.17 MWh to 6.00 MWh per tonne, depending on the method of brine concentration used (as shown in Table 1).

The power generated by WTG 110 determines the amount of desalinated water produced, which is about the same volume as the brine available for NaOH production. FIG. 2 illustrates a chlor-alkali NaOH production process 200 implemented by the direct air carbon dioxide capture device 100, according to an embodiment of the invention. Brine from seawater reverse osmosis is passed through nano-filters (Step 210) to reduce harmful concentrations of ions such as Ca++ and Mg++. The brine permeate from this step has ~5 wt. % NaCl. The retentate is discarded. The brine from nanofiltration is passed through electrodialysis (ED, Step 220) to increase the salt concentration to ~20% where the solution is saturated, mainly with sodium chloride (NaCl). The brine from ED is concentrated further to about 26% using either evaporation or mechanical vapor compression (MVC, Step 230). Prior to electrolysis, the remaining hardness ions in the brine are removed by chemical softening (Step 240) and ion exchange (Step 250). HCl is added (Step 260) to lower pH, which along with system losses of MVC (or the evaporator) accounts for about 10% of the energy used internally, a small amount of energy use compared with Steps 210, 220, and 230.

Electrolysis uses an electric current to drive a chemical reaction that otherwise would not occur spontaneously. Electrolysis (Step 270) of the concentrated brine produces aqueous NaOH and gaseous $Cl_2$ and $H_2$. The NaOH solution sprayed from nozzles of the rotor-contactor reacts with the $CO_2$ in the airstream, initiating sequestration. The efficiency of step 270 can be improved by using turbine generator heat transferred through a heat exchanger for preheating the concentrated brine before passing it to the electrolyzer.

One kilogram of 26 wt % brine entering the electrolyzer contains 260 g or 4.45 moles of NaCl. For every mole of NaCl consumed, a mole of NaOH is produced, therefore maximum production from electrolysis will be 4.45 moles or 0.178 kg of NaOH per kg of brine.

An alternative or additional pathway to that described in Step 270 uses direct electrosynthesis (DE) of sodium hydroxide and hydrochloric acid produced from the brine stream. This technique produces NaOH without the costly purification and concentration of the chlor-alkali process. Electrosynthesis of NaOH and HCl uses less energy than electrolysis, at 1.8 MWh per tonne of NaOH, but it produces a much lower concentration of NaOH (~2 M), or about 44 g of HCl per kilogram of brine (7 wt. %). Hydrochloric acid is a valuable by-product of DE that is fed back into the SWRO and NaOH production processes to lower the pH of the feed solution.

The power generated by the selected wind turbine must balance between the amount of energy consumed by RO desalination and the amount needed for NaOH production and spray emission. Energy consumption estimates for onboard NaOH production (Table 1) include the more costly evaporation method of the chlor-alkali process as an upper reference point. In the preferred embodiment of the invention, mechanical vapor compression (MVC) is used to concentrate brine from 20% to 26%, as it consumes less than 10% of the energy needed by evaporative concentration.

TABLE 1

| | | | Energy use MWh/t NaOH | |
| | NaCl wt. % | | | |
| Process step | Input | Output | MVC | Evap. |
| --- | --- | --- | --- | --- |
| 210 Nanofiltration | 7 | 7 | 0.17 | |
| 220 Electrodialysis | 7 | 20 | 0.41 | |
| 230 MVC/(Evaporation) | 20 | 26 | 0.24 | (3.07) |
| 270 Electrolysis | 26 | | 2.35 | |
| Total MWhr/t of NaOH | | | 3.17 | (6.00) |

Energy use estimates for chlor-alkali production of NaOH from RO desalination brine are shown per tonne dry weight of NaOH.

A minimum energy of 3.17 megawatt-hours per tonne of NaOH produced is required to bring about the chlor-alkali reactions. Optimizing NaOH production involves maximizing the efficiency of each step using automated control of flow paths, flow rates, solution concentrations, and chemical ratios.

The maximum stoichiometric yield of NaOH (dry equivalent) is 48 g per kilogram of 7 wt. % brine. Losses in yield can result from equipment voltage losses, loss of membrane efficiency, and the need to divert and purge parts of the waste stream. Input brine (7 wt. % NaCl) fed through the chlor-alkali process produces a maximum of 48 g of NaOH, yielding 42 g of chlorine gas and 1.2 g of hydrogen gas.

The energy needed for NaOH conveyance to the contactor and NaOH solution misting includes pumping the NaOH fluid to tower height and for the fluid nozzle pressure over the number of nozzles used. The centrifugal force of the fluid reduces this pumping energy load in the blade pipes as the rotor spins. For example, the 10 MW turbine, with a 220 m rotor at 10 rpm has blade tip nozzle pressure of 880 psi or 6,067 kPa, well above the pumping pressure needed for lifting the fluid 100 m (979 kPa or 142 psi) and nozzle pressure (100 kPa to 620 kPa).

The efficiency of NaOH production and the emission from the rotor contactor are factors in sizing the NaOH production chain along with the turbine output related to windspeed distribution and variability at the specific operating site. The amount of electric power consumed for desalination is balanced against the power needed for NaOH production. More production of NaOH requires more energy; then less energy is available for desalination, reducing the amount of brine feedstock, thus limiting the capacity of NaOH production.

For example, a 10 MW turbine operating at 50% of net rated capacity generates ~44,000 MW hours of power per year.

By using 80% of the power—35,200 MWh and consuming 3.5 kWh per m³ for SWRO desalination, the annual production of brine is 10.06 million m³. By adding brine dialysis in Step 220, fresh water production is increased 16% to 11.7 million m³. In the preferred embodiment of the present invention, mechanical vapor compression (MVC) is used for Step 230, where brine concentration increases from 20% to 26%. Using MVC in NaOH production consumes 3.17 MWh per ton of NaOH (Table 1).

The 20% of power generated, a balance of 8,800 MWh, is available for NaOH production through the chlor-alkali process. Here, the primary energy load is the membrane electrolyzer, consuming about three-quarters of the total operating energy load, which amounts to ~6,600 MWh of the 8,800 MWh available. Energy consumption is based on a process model for NaOH with a production rate of 64.8 kg/h (dry) or about 570 tonnes/MW per year.

The Example 10 MW turbine, using 20% of its power, or 8,800 MWh for NaOH production, consumes 3.17 MWh/tonne, thereby yielding 2,776 tonnes of NaOH per year. To capture one ton of $CO_2$ requires at least 0.9 ton of NaOH. Thus the blade contactor, emitting a solution containing 2,776 tonnes of NaOH (dry equivalent), would capture 3,084 tonnes of $CO_2$ per year.

The DAC device controller is programmed to ensure optimal air to liquid (NaOH) mass flow ratios at selected NaOH concentrations. Studies based on air tunnel-type tests using an open air flow, sprayed with NaOH with an air/liquid mass flow ratio of 8.3 and a drop residence of 3 meters, indicated an absorption rate of 0.4 tonne of $CO_2$ per m² contactor area. Using this data for the 10 MW turbine with a rotor contactor area of 38,000 m² indicates $CO_2$ capture could reach 15,200 tons of $CO_2$ per year if sufficient NaOH is available. However, NaOH production is limited by turbine power production and the allocation of available energy between SWRO desalination and NaOH production.

FIG. 3 illustrates a system of direct air carbon dioxide capture devices 100 according to an embodiment of the invention.

The invention has been described herein using specific embodiments for illustration only. However, it will be readily apparent to one of ordinary skill in the art that the invention's principles can be embodied in other ways. Therefore, the invention should not be regarded as limited in scope to the specific embodiments disclosed herein; it should be fully commensurate in scope with the following claims.

I claim:

1. A method of capturing atmospheric carbon dioxide for ocean sequestration, the method comprising the steps of:
    generating electric power via an offshore wind turbine generator comprising a rotor with blades, wherein the offshore wind turbine generator is located in a saltwater environment;
    desalinating salt water from the saltwater environment, using the electric power generated via the wind turbine generator, to produce brine;
    processing the brine, using the electric power and heat generated via the wind turbine generator, to produce sodium hydroxide, wherein processing the brine comprises preheating the brine using the heat generated via the wind turbine generator;
    pumping the sodium hydroxide to the blades, using the electric power generated via the wind turbine generator and centrifugal force provided by rotation of the blades;
    emitting, via the blades, the sodium hydroxide solution into an air stream passing through rotor of the wind turbine generator;
    permitting the emitted sodium hydroxide solution to react, in Earth's atmosphere, with atmospheric carbon dioxide to form sodium carbonate or sodium bicarbonate droplets; and
    mixing the sodium carbonate or sodium bicarbonate droplets into the saltwater environment and sequestering the sodium carbonate or sodium bicarbonate within the saltwater environment.

2. The method of claim 1, wherein the step of desalinating saltwater produces fresh water.

3. The method of claim 1, wherein the step of processing the brine comprises the steps of:
    purifying the brine to produce purified brine;

increasing salt concentration of the purified brine to produce concentrated brine; and performing electrolysis on the concentrated brine to produce the sodium hydroxide solution, hydrogen gas, and chlorine gas.

4. The method of claim 3, further comprising the steps of compressing and storing the hydrogen gas and converting the chlorine gas into a chlorine-based chemical.

5. The method of claim 1, wherein the step of processing the brine comprises the steps of direct electrosynthesis of the sodium hydroxide solution and hydrochloric acid through electrodialysis.

6. The method of claim 1, wherein the step of emitting the sodium hydroxide solution comprises spraying the sodium hydroxide solution via a plurality of nozzles disposed on the blades of the wind turbine generator.

7. The method of claim 1, wherein the step of desalinating salt water comprises reverse osmosis or evaporation and condensation.

8. The method of claim 1, wherein the step of processing the brine comprises electrosynthesizing the brine to form the sodium hydroxide solution and hydrochloric acid.

9. A method of capturing atmospheric carbon dioxide for ocean sequestration, the method comprising the steps of:

generating electric power via an offshore wind turbine generator comprising a rotor with blades, wherein the offshore wind turbine generator is located in a saltwater environment;

desalinating salt water from the saltwater environment, using the electric power generated via the wind turbine generator, to produce brine;

processing the brine, using the electric power and heat generated via the wind turbine generator, to produce sodium hydroxide, wherein processing the brine comprises preheating the brine using the heat generated via the wind turbine generator;

pumping the sodium hydroxide to the blades, using the electric power generated via the wind turbine generator and centrifugal force provided by rotation of the blades;

emitting the sodium hydroxide solution into an air stream passing through the rotor of the wind turbine generator, wherein the step of emitting the sodium hydroxide solution comprises spraying the sodium hydroxide solution via a plurality of nozzles disposed on the blades of the wind turbine generator;

permitting the emitted sodium hydroxide solution to react, in Earth's atmosphere, with atmospheric carbon dioxide to form sodium carbonate or sodium bicarbonate droplets; and mixing the sodium carbonate or sodium bicarbonate droplets into the saltwater environment and sequestering the sodium carbonate or sodium bicarbonate within the saltwater environment.

10. The method of claim 9, wherein the step of desalinating salt water produces fresh water.

11. The method of claim 9, wherein the step of processing the brine comprises the steps of:

purifying the brine to produce purified brine;

increasing salt concentration of the purified brine to produce concentrated brine; and performing electrolysis on the concentrated brine to produce the sodium hydroxide solution, hydrogen gas, and chlorine gas.

12. The method of claim 11 further comprising the steps of compressing and storing the hydrogen gas and converting the chlorine gas into a chlorine-based chemical.

13. The method of claim 9, wherein the step of processing the brine comprises the steps of direct electrosynthesis of the sodium hydroxide solution and hydrochloric acid through electrodialysis.

14. The method of claim 9, wherein the step of desalinating salt water comprises reverse osmosis or evaporation and condensation.

15. The method of claim 9, wherein the step of processing the brine comprises electrosynthesizing the brine to form the sodium hydroxide solution and hydrochloric acid.

16. The method of claim 9, wherein mixing the sodium carbonate or sodium bicarbonate droplets into the saltwater environment reduces acidity of the saltwater environment enabling additional sequestration of atmospheric carbon dioxide.

17. A method of capturing atmospheric carbon dioxide for sequestration, the method comprising the steps of:

generating electric power via an offshore wind turbine generator comprising a rotor with blades, wherein the offshore wind turbine generator is located in a saltwater environment;

desalinating salt water from the saltwater environment, using the electric power generated via the wind turbine generator, to produce brine;

processing the brine, using the electric power and heat generated via the offshore wind turbine generator, to produce sodium hydroxide, wherein processing the brine comprises preheating the brine using the heat generated via the wind turbine generator;

pumping the sodium hydroxide to the blades of the wind turbine generator using the electric power and centrifugal force provided by rotation of the blades;

emitting a sodium hydroxide solution into an air stream passing through the rotor of the wind turbine generator, wherein the step of emitting the sodium hydroxide solution comprises spraying the sodium hydroxide solution via a plurality of nozzles disposed on the blades of the wind turbine generator;

permitting the emitted sodium hydroxide solution to react, in Earth's atmosphere, with atmospheric carbon dioxide to form sodium carbonate or sodium bicarbonate droplets; and mixing the sodium carbonate or sodium bicarbonate droplets into the saltwater environment and sequestering the sodium carbonate or sodium bicarbonate within the saltwater environment.

* * * * *